United States Patent [19]

Harper et al.

[11] 4,049,774
[45] * Sept. 20, 1977

[54] PROCESS FOR REDUCING FORMATION OF GYPSUM SCALE DURNG THE WASHING OF CALCIUM SULPHATE HEMIHYDRATE CRYSTALS

[75] Inventors: Douglas Charles Harper, Ipswich; Norman Robinson; Stanislaw Maria Janikowski, both of Felixstowe, all of England

[73] Assignee: Fisons Limited, London, England

[ * ] Notice: The portion of the term of this patent subsequent to Aug. 3, 1993, has been disclaimed.

[21] Appl. No.: 522,265

[22] Filed: Nov. 8, 1974

Related U.S. Application Data

[63] Continuation-in-part of Ser. No. 300,575, Oct. 25, 1972, abandoned, which is a continuation-in-part of Ser. No. 198,425, Nov. 21, 1971, abandoned.

[30] Foreign Application Priority Data

| Nov. 12, 1970 | United Kingdom | 53869/70 |
| Jan. 16, 1971 | United Kingdom | 2225/71 |
| Sept. 24, 1971 | United Kingdom | 44560/71 |
| Oct. 30, 1971 | United Kingdom | 50564/71 |
| May 5, 1972 | United Kingdom | 20966/72 |
| May 5, 1972 | United Kingdom | 20967/72 |
| May 11, 1972 | United Kingdom | 22176/72 |

[51] Int. Cl.$^2$ ............................................. C01B 25/22

[52] U.S. Cl. .................................. 423/167; 423/319; 423/320; 423/555

[58] Field of Search ............... 423/167, 266, 267, 268, 423/317, 319, 320, 321, 555

[56] References Cited

U.S. PATENT DOCUMENTS

| 3,192,014 | 6/1965 | Leyshan et al. | 423/266 |
| 3,238,142 | 3/1966 | Perry | 252/358 |
| 3,594,123 | 7/1971 | Encke et al. | 423/320 |
| 3,598,755 | 8/1971 | McBroom et al. | 252/358 |
| 3,645,677 | 2/1972 | Akazawa et al. | 423/555 |
| 3,796,790 | 3/1974 | Sirianni et al. | 423/319 |
| 3,801,699 | 4/1974 | Arnold | 423/244 |
| 3,972,981 | 8/1976 | Harper et al. | 423/555 |

FOREIGN PATENT DOCUMENTS

| 539,641 | 1931 | Germany | 423/321 |
| 391,901 | 2/1964 | Japan | |
| 1,356,586 | 6/1974 | United Kingdom | |
| 236,435 | 11/1969 | U.S.S.R. | |

Primary Examiner—O. R. Vertiz
Assistant Examiner—Wayne A. Langel
Attorney, Agent, or Firm—Wenderoth, Lind & Ponack

[57] ABSTRACT

A process for reducing formation of calcium sulphate scale during the washing of calcium sulphate hemihydrate crystals by washing the crystals with a liquor containing certain surface-active agents in sufficient amount to give a concentration of from 0.0002 to 1% by weight of surface-active agent in the wash liquors.

10 Claims, No Drawings

PROCESS FOR REDUCING FORMATION OF GYPSUM SCALE DURNG THE WASHING OF CALCIUM SULPHATE HEMIHYDRATE CRYSTALS

The present invention relates to a process for reducing scale formation, and is a continuation-in-part of our copending Application No 300575, filed 10/25/72 itself a continuation-in-part of our earlier, abandoned Application No 198425 filed 11/21/71.

During the production of phosphoric acid by the wet process, calcium sulphate is deposited and separated from the product acid by a filtration step. The filter cake contains entrapped phosphoric acid and the cake is therefore washed usually in a number of stages with water and/or dilute phosphoric acid, to recover this acid. However, where the calcium sulphate is in the form of the anhydrite or hemihydrate, calcium sulphate dihydrate (gypsum) may be deposited during the washing of the filter cake to form a scale upon the filter and associated pipework which severly hampers efficient operation of the filter.

We have now found that the problem of scale formation may be reduced by incorporating certain anionic and/or non-ionic surface-active agents into the wash liquors with which the anhydrite or hemihydrate crystals are washed after they have been formed and separated off from the phosphoric acid.

Accordingly, the present invention provides in a process for producing phosphoric acid wherein phosphate rock is acidulated with a mineral acid and crystals of calcium sulphate hemihydrate are formed, separated off from the phosphoric acid and thereafter washed, the improvement which comprises washing the calcium sulphate hemihydrate crystals with an aqueous wash liquor which prior to contact with the crystals contains less than 30% $P_2O_5$ and less than 10 parts by weight of $H_2SO_4$ per 100 parts by weight of $H_3PO_4$ and contains from 0.0002 to 1.0% by weight of an additive selected from, compounds of the empirical general formula:

$$R^1R^2S(O)_n \quad \quad \text{I}$$

(wherein $n$ has a value of 3 or 4 and when $n$ is 3, $R^2$ is hydrogen and $R^1$ is an alkyl or alkaryl group and when $n$ is 4, $R^1$ is an alkyl or aralkyl group and $R^2$ is hydrogen or an $R^1$ group; alkylene oxide condensates of an alcohol, phenol or alkylphenol) and mixtures and salts, esters and amides of such compounds whereby the deposition of calcium sulphate dihydrate scale due to the recrystallisation of calcium sulphate hemihydrate to calcium sulphate dihydrate is reduced; the total contact time between the calcium sulphate hemihydrate crystals and the wash liquor being less than 10 minutes.

The compounds of general formula I contain at least one group $R^1$. This is an alkyl group which may be straight or branched and may carry substituents thereon; e.g., hydroxyl, carbonyl or sulphonic acid groups. The alkyl chain may also be interrupted by one or more ethylenic or ether linkages and preferably contains from 8 to 18 carbon atoms. $R^1$ may also be an aralkyl group such as a benzyl or alkylbenzyl group. It is preferred that the aryl moiety of the aralkyl group be an alkyl phenyl group in which the alkyl group contains from 8 to 18 carbon atoms, notably a nonyl phenyl group. Alternatively $R^1$ may be an alkaryl group. The group $R^2$ may be hydrogen or an $R^1$ group depending upon the value of n.

The compound of formula I for present use thus include
alkylaryl sulphonic acids;
mono- and di-alkyl sulphate esters;
sulphate esters of alkylene oxide condensates with alcohols,
glycols or alkyl phenols;
alkane sulphonates; and
mixture of these.

The alkylaryl sulphonic acids for present use may be derived from mono- or polybenzenoid compounds, e.g., alkylbenzene or alkylnaphthalene compounds, and may possess one, or two or more alkyl groups. The alkyl groups may be straight or branched and preferably contain more than 8 carbon atoms, e.g., 8 to 18 carbon atoms. Thus, the alkyl group may be derived from the condensation of an olefin, e.g., of four molar proportions of propylene; or has a straight chain, e.g., a lauryl group. Mixtures of alkylaryl sulphonates in which the alkyl group has a chain length which varies about a desired mean length may be used, as is the case when the alkyl group is derived from an olefin condensate. Mixtures of different sulphonic acids may be used.

Preferred sulphonic acids for present use include mono-alkyl benzene sulphonic acids, e.g., octyl-, nonyl-, decyl-, dodecyl-, and hexadecylbenzene sulphonic acids.

The alkyl sulphates for present use may possess one or two alkyl groups. The alkyl groups may be straight or branched, may be saturated or unsaturated and preferably contain more than 8 carbon atoms, e.g., 8 to 18 carbon atoms. The alkyl groups may be derived from the condensation of an olefin, e.g., of four molar proportions of propylene. Specific examples of suitable alkyl groups include 2-ethyl-hexyl; lauryl; and propylene tetramer groups. Mixtures of alkyl sulphates in which the alkyl groups have chain lengths which cary about a desired mean length, may be used, as is the case when the alkyl group is derived from an olefin condensate.

Typical alkyl sulphates for present use include mono- or di-octyl-, nonyl-, decyl-, dodecyl- and hexadecyl sulphates.

Sulphate esters of alkylene oxide condensates for present use include sulphate mono esters of alkylene oxide condensate type non-ionic surface-active agents, notably alkylene oxide condensates with alkanols or alkylphenols. Preferred alkylene oxides are ethylene, propylene or butylene oxides or mixtures thereof. The alcohols with which these are condensed may be monohydric or polyhydric, preferably containing 2 or 3 hydroxyl groups, and are primary or secondary alkanols in which the alkyl groups is straight of branched and preferably contains more than 8 carbon atoms, e.g., 8 to 18, preferably 12-15 carbon atoms. Mixture of alcohols or glycols in which the chain length of the alkyl group varies about a desired mean length may be used, as is the case when they are derived from an olefin condensate. The alkyl phenol with which the alkylene oxide is condensed may contain one or more alkyl groups of the above types. The phenol moieties may have contained one or more phenolic OH groups, each or only some of which have been condensed with the alkylene oxide moieties. Mixtures of different non-ionic surface-active agents may be used.

Examples of non-ionic surface-active agents whose sulphate esters are suitable for present use include polyalkylene ether alcohols, e.g., those derived from 4 to 14 molar proportions of ethylene oxide and a $C_{8-14}$ alcohol; or octyl- or nonyl phenol condensed with from 3 to 30 molar proportions of ethylene oxide.

The alkane sulphonates for present use include those of the general formulae:

$$R^3CH=CH(CH_2)_pSO_3H, \quad \text{II}$$

$$R^3CH_2CHOH(CH_2)_pSO_3H, \quad \text{III}$$

$$R^3CHOHCH_2(CH_2)_pSO_3H, \quad \text{IV}$$

and $$R^3SO_3H \quad \text{V}$$

wherein $R^3$ is an alkyl chain optionally interrupted by one or more ethylenic and/or ether linkages and optionally carrying one or more hydroxyl, carbonyl oxygen or $-SO_3H$ group substituents, and $p$ has a value of from 0 to 11.

It is preferred that the alkyl groups to which the $-SO_3H$ are bonded contain from 5 to 21, notably from 11 to 18, carbon atoms. Furthermore, it is not necessary that the $-SO_3H$ group be bonded to the terminal carbon atoms of the chain, but it may form part of a side chain. Thus, compounds of formula V may be made by the chlorsulphonation of a saturated hydrocarbon followed by hydrolysis to give a product of the typical formula $$R^4CH_2-\underset{\underset{SO_3H}{|}}{CH}-CH_2R^5$$

where $R^4$ is an alkyl group and $R^5$ is hydrogen or an $R^4$ group. On the other hand where an $\alpha$ olefin is sulphonated the product, after hydrolysis will be a mixture of compounds of formulae II, III and IV in which the $-SO_3H$ group is attached to the terminal carbon atom.

Preferred alkane sulphonates for present use are the products obtained by the sulphonation of $C_{14}-C_{18}$ olefins or a mixture of substantially straight chain alkanes having an average chain length of from 8 to 18, notably 12 to 14 carbon atoms.

The non-ionic surface-active agents for present use include those described above with respect to the sulphate esters of alkylene oxide condensates, namely alkylene oxide, e.g., ethylene oxide, condensates with alkyl phenols, such as octyl- or nonyl phenol, or with $C_{8-14}$ alcohols.

The compounds of formula I may be used as the free acid or as a derivative thereof, such as an amide or a lower alkyl, e.g., methyl or ethyl, ester thereof. However, it is preferred that they be used in the form of a salt, e.g., an alkali-metal, notably sodium or potassium, salt; an amine salt, e.g., triethanolamine; or an ammonium salt thereof.

The surface-active agents for present use are known materials and may are commercially available. These commercially available materials may be used as such with or without any purification thereof.

Mixtures of the surface-active agents may be used, and indeed, we have found that this is often advantageous since certain mixtures may exhibit synergistic effects. A mixture of an alkylbenzene sulphonate with an ethylene oxide condensate of an alkylphenol in weight proportion of from 50 to 80% of the anionic to form 50 to 20% of the non-ionic surface-active agent is preferred. Particularly preferred are mixtures of one or more sodium straight chain mono- nonyl, undecyl or dodecyl benzene sulphonates with a condensate of mono-octyl or nonyl phenol with 8 to 14, e.g., 9, molar proportions of ethylene oxide or mixtures of one or more such benzene sulphonates with ethylene oxide condensates with long chain ($C_{12}-C_{15}$) secondary alcohols. These mixtures desirably contain the anionic and non-ionic ingredients in weight proportions of from 7:3 to 6:4.

The amounts of surface-active agent to be used in the present invention are given below in terms of the total amount of active anionic and/or non-ionic ingredient or mixture of ingredients.

In the process of the present invention formation of scale is inhibited by having surface-active agent present in the washing liquors contacted with the hemihydrate crystals. This is conveniently achieved by the addition of the surface-active agent to the wash liquors in the desired amounts before they are used in the wash.

We prefer to use a concentration of from 0.0002 to 0.3, preferably 0.0002 to 0.06, of the surface-active agent based on the weight of the wash liquor. Whilst it may not be necessary to add the surface-active agent to these wash liquors containing high proportions of $P_2O_5$ (by virtue of the fact that they have removed adhering phosphoric acid from the crystals in a previous wash stage) we have found that it is necessary to include the surface-active agent in those wash liquors which contain less than 30%, notably less than 15% w/w $P_2O_5$, since it is in these wash liquors that the predominant scaling occurs. The term 'earlier stages of the washing process' is used herein to denote all stages in the washing process where the wash liquors contain appreciable amounts of phosphoric acid (e.g., are at that end of the filter receiving the phosphoric acid/hemihydrate slurry from the acidulation stage). It does not necessarily denote only the first washing stage but may, for example, denote also or only the second washing stage. In contrast, the term 'later stages of the washing process' denotes those stages where water or dilute phosphoric acid (i.e., containing less than 30% $P_2O_5$) is the wash liquor. Again, this term need not denote only the last stage, but may, for example, denote the penultimate one and/or two stages. A specific example of the addition of the surface-active agent to a series of washing stages is the addition of the surface-active agent to the seal boxes of the last two stages in a four stage washing process so as to provide between 0.002 and 0.05% by weight of the surface-active agent in the wash liquors of the second and third stages. If desired, some surface-active agent, e.g., up to about 0.05% by weight, may be added to the water fed to the fourth washing stage.

The surface-active agent is conveniently added to the wash liquors in the form of an aqueous concentrate, e.g., containing 30% by weight or more of active ingredient.

Apart from the incorporation of the surface-active agent in the wash liquors, the washing of the hemihydrate is carried out in known manner, although it may be possible to use a wider range of temperatures of the wash liquor than hitherto, e.g., from 20° to 90° C, preferably 50° to 80° C. As indicated, the total contact time between the wash liquors and the hemihydrate crystals is less than 10 minutes, typically less than 5, or in many cases 1, minute.

The invention will now be illustrated by the following Examples in which all parts and percentages are by weight unless otherwise stated:

EXAMPLE 1

The formation of scale was determined in a test rig where a sample of hemihydrate filter cake, obtained during the preparation of phosphoric acid from Togo rock, was washed with a series of washes and the filtrate from each was collected. Each filtrate was stood overnight to permit development of scale and the extent of scale formation was assessed in terms of the dry weight of solids deposited during this time. Successive washes of the filter cake contained progressively smaller amounts of phosphoric acid therein, so as to simulate as closely as possible the washing conditions which would be used during a multi-stage continuous washing operation of a filter in a commercial process.

A slurry was prepared by mixing 184 parts of hemihydrate into phosphoric acid (282 parts by volume, 50% $P_2O_5$) and sulphuric acid (5 parts by volume, 100% $H_2SO_4$) at 95° C. This slurry was filtered under vacuum and the filtrate discarded. The filter cake was then washed with 143 parts by volume of phosphoric acid (15% $P_2O_5$) at 55° C and the filtrate again discarded. The filter cake was then washed successively with 143 parts by volume each of 5% and 1% $P_2O_5$ phosphoric acid at 50° C and the filtrates collected in both cases, as washes 1 and 2 respectively. The filter cake was finally washed with 94 parts by volume of water at 55° C (wash 3) and the filtrate collected.

All the individual filtrates were stood in covered beakers overnight at room temperature to permit scale to develop. At the end of this time the scale was scraped from the beaker, washed in acetone, air dried and weighed.

The above test was carried out first with no additive present in any of the mother liquors or wash liquors; and then with 0.015% by weight, based on the total weight of water and phosphoric acid present in the liquid phase, of alkyl sulphate added to wash liquors for washes 1, 2 and 3. The results are set out below.

| Additive present | Weight of scale formed in gs. | | |
|---|---|---|---|
| | Wash 1 | Wash 2 | Wash 3 |
| Nil | 0.454 | 0.381 | 0.286 |
| 0.015% Sodium alkyl ($C_{12}$) sulphate | 0.12 | 0.12 | 0.12 |
| 0.015% of a mixture of sodium dodecylbenzene sulphonate and sodium secondary alkyl ($C_{12}$) sulphate | 0.04 | 0.12 | 0.12 |

EXAMPLE 2

The process of Example 1 was repeated except that 0.05% by weight, based on the total weight of water and phosphoric acid present in the liquid phase, of the material sold under the Trade Name of Teepol CH53 (which is a mixture of 7 parts of sodium lauryl benzene sulphonate with 3 parts of a condensate of nonyl phenol with from 8 to 9 molar proportions of ethylene oxide, 30% active ingredient) was added to the wash liquors. The amount of scale deposited from washes 1, 2 and 3 was 0.013, 0.009 and 0.004 gs respectively.

EXAMPLE 3

The process of Example 1 was repeated using other surface-active agents at various concentrations. The results of these tests are set out below:

| Surface-active agent used | % w/w active ingredient used | Scale formed in gs | | |
|---|---|---|---|---|
| | | Wash 1 | Wash 2 | Wash 3 |
| Sodium toluene sulphonate | 0.045 | 0.13 | 0.17 | 0.22 |
| Sodium xylene sulphonate | 0.015 | 0.07 | 0.08 | 0.09 |
| Triethanolamine salt of dodecylbenzene sulphonate | 0.03 | 0.03 | 0.06 | 0.12 |
| Sodium lauryl sulphonate | 0.02 | 0.05 | 0.08 | 0.04 |
| Condensate of ethylene oxide with a $C_{8-12}$ glycol sold under the trade name of supronic B10 | 0.15 | 0.05 | 0.14 | 0.06 |

EXAMPLE 4

In a modified version of the test method of Example 1 a slurry was prepared by mixing calcium sulphate hemihydrate crystals (40 parts) derived from Togo rock with phosphoric acid (160 parts 1% $P_2O_5$). This slurry was then immediately filtered through a Buchner funnel using a sintered glass disc filter at a pressure of 150 mms Hg absolute and the filtrate was collected in a beaker. The filtrate was stood overnight and the scale was collected and weighed as in Example 1. When used, the surface-active agent was dissolved in the phosphoric acid used to prepare the slurry.

The results of this modified test are set out below:

| | Additive | Amount w/w % in liquid | Amount of scale formed in gs |
|---|---|---|---|
| | NONE | NONE | 0.41 |
| a) | Sodium dodecylbenzene sulphonate | 0.1 | 0.002 |
| b) | Sodium salt of straight chain $C_{11}$ alkyl benzene sulphonate | 0.001 | 0.163 |
| c) | Condensate of nonyl phenol with 8 mols of ethylene oxide | 0.013 | 0.24 |
| d) | Condensate of nonyl phenol with 9 mols of ethylene oxide | 0.013 | 0.17 |
| e) | Condensate of $C_{15}$ secondary alcohol with 9 mols of ethylene oxide | 0.013 | 0.06 |
| f) | A mixture of 7 parts of additive b with 3 parts of a condensate of nonyl phenol with 8 to 10 mols of ethylene oxide (sold under the Trade Name Comprox) | 0.0047 | 0.058 |
| | | 0.0094 | 0.046 |
| | | 0.0187 | 0.024 |
| | | 0.047 | 0.004 |
| g) | A mixture of additive b with: additive d | 0.001 parts of b with: | |
| | | 0.0001 | 0.14 |
| | | 0.001 | 0.05 |
| | | 0.013 | 0.01 |
| | additive c | 0.001 | 0.07 |
| | | 0.002 | 0.02 |
| | | 0.004 | 0.01 |

EXAMPLE 5

Example 1 was repeated using the sodium salts of n-octane sulphonate and a sulphate ester of a condensate of 8.5 molar proportions of ethylene oxide with 1 molar proportion of nonyl phenol as the additives. In these tests only two $P_2O_5$ washes at 18 and 10% $P_2O_5$ respectively were used and only the filtrates from the 10% $P_2O_5$ and the water washes were collected. These filtrates were stood at room temperature for 4 hours for the scale to develop. The scale was then collected, dried and weighed as in Example 1. The results of these tests are set out below:

| Addtive used | % w/w active ingredient used | Scale formed in gs 10% P$_2$O$_5$ | Water |
|---|---|---|---|
| None | — | 0.32 | 0.07 |
| Sulphated condensate of 8.5 mols. ethylene oxide with nonyl phenol, sodium salt | 0.02 | 0.24 | 0.03 |
| Sodium salt of n-octane sulphonate | 0.04 | 0.19 | 0.03 |

We claim:

1. In a process for producing phosphoric acid wherein phosphate rock is acidulated with a mineral acid and crystals of calcium sulphate hemihydrate are formed, separated off from the phosphoric acid and thereafter washed, the improvement which comprises washing the calcium sulphate hemihydrate crystals with an aqueous wash liquor which prior to contact with the crystals, contains P$_2$O$_5$ in amounts less than 30% and H$_2$SO$_4$ in amounts of less than 10 parts by weight per 100 parts by weight of H$_3$PO$_4$ present in the aqueous wash liquor and contains from 0.0002 to 1.0% by weight of an additive selected from the group consisting of compounds of the empirical general formula:

$$R^1R^2S(O)_n \qquad I$$

wherein $n$ has a value of 3 or 4 and when $n$ is 3 R$^2$ is hydrogen and R$^1$ is an alkyl or aralkyl group and when $n$ is 4 R$^1$ is an alkyl or aralkyl group and R$^2$ is hydrogen or an R$^1$ group; alkylene oxide condensates of an alcohol, phenol or an alkyl phenol and mixtures and salts, esters and amides of said compounds whereby the deposition of calcium sulphate dihydrate scale due to the recrystallisation of the calcium sulphate hemihydrate to calcium sulfate dihydrate is reduced; the total contact time between the calcium sulphate hemihydrate crystals and the wash liquor during washing being less than 10 minutes.

2. A process as claimed in claim 1 wherein the additive comprises a mixture of an alkylbenzene sulphonic acid, or alkali-metal salt thereof, with an ethylene oxide condensate of an alkylphenol.

3. A process as claimed in claim 2 wherein the mixture comprises from 50 to 80 parts by weight of the sulphonic acid or salt thereof and from 50 to 20 parts by weight of the condensate.

4. A process as claimed in claim 3 wherein the alkyl group in the alkylbenzene sulphonic acid contains from 9 to 11 carbon atoms and the condensate is a condensate of from 5 to 15 molar proportions of ethylene oxide with octyl- or nonylphenol.

5. A process according to claim 1 wherein the additive is used in the form of an alkali-metal or ammonium salt thereof.

6. A process as claimed in claim 1 wherein R$^1$ is an alkyl group containing from 8 to 18 carbon atoms, optionally interrupted by one or more ether linkages.

7. A process as claimed in claim 1 wherein the additive is an ethylene oxide condensate of an alkyl phenol or of a monohydric or dihydric alkanol.

8. A process as claimed in claim 1 wherein the compound of formula 1 is selected from alkylbenzene sulphonic acids; monoalkyl sulphate esters; dialkyl sulphate esters; sulphate mono-esters of alkylene oxide condensates with alcohols, glycols or alkylphenols; alkane sulphonates; and mixtures of these.

9. A process as claimed in claim 1 wherein the washing is carried out in a number of stages and the additive is added to the wash liquors in two or more of the wash stages.

10. A process as claimed in claim 1 wherein the crystals are washed in situ on the filter in which the crystals are separated from the phosphoric acid.

* * * * *